United States Patent

Poletti

[15] 3,638,973

[45] Feb. 1, 1972

[54] JOINT MEANS FOR USE IN WORK SUPPORTING ARM

[72] Inventor: Charles Ellis Poletti, 5400 Pooks Hill Road, Bethesda, Md. 20014

[22] Filed: June 4, 1969

[21] Appl. No.: 830,422

[52] U.S. Cl. ..........................285/184, 128/20, 137/583, 248/276, 269/22, 269/75, 285/164, 285/166, 285/168, 285/261, 285/281, 285/306, 285/330
[51] Int. Cl. ..........................................................F16l 27/00
[58] Field of Search..................285/184, 181, 306, 261, 272, 285/97, 98, 166, 18, 322, 164, 317, 308, 168, 107, 169 BP, 281, 330; 248/376, 276; 128/20; 269/22, 75; 287/14

[56] References Cited

UNITED STATES PATENTS

| 205,069 | 6/1878 | Farnsworth.........................285/166 |
| 652,789 | 7/1900 | Leitelt...............................285/169 |
| 1,460,697 | 7/1923 | Bendlin............................285/166 X |
| 2,827,312 | 3/1958 | Spencer............................285/308 X |

FOREIGN PATENTS OR APPLICATIONS

| 1,310,665 | 10/1962 | France.................................285/106 |
| 141,879 | 4/1920 | Great Britain......................285/106 |

*Primary Examiner*—Dave W. Arola
*Attorney*—Holman & Stern

[57] ABSTRACT

A joint means for coupling two elements forming part of a work-supporting arm wherein the joint means is operable between a relaxed condition in which relative movement is permitted between the elements of the work-supporting arm and a rigidified condition in which the elements of the work-supporting arm are secured against relative movement. Pressurized fluid is utilized to effect rigidification with a continuous pressurized fluid system being operable to rigidify a plurality of joint means in a single work-supporting arm. Such a work-supporting arm is shown to be particularly useful in a surgical retractor wherein the arm includes retractor-retaining means, operable by the same pressurized fluid system to permit removal of the surgical retractor from the work-supporting arm.

17 Claims, 38 Drawing Figures

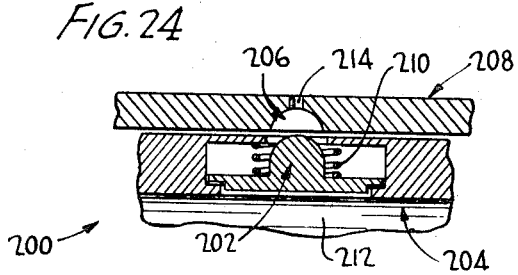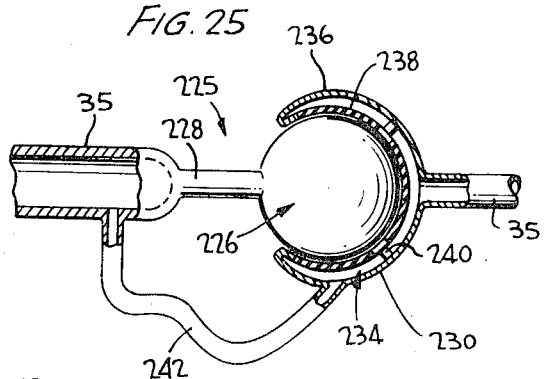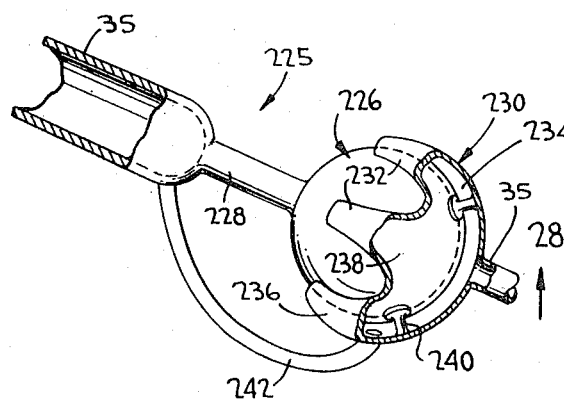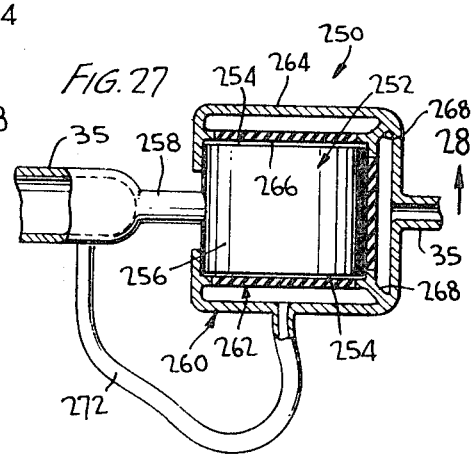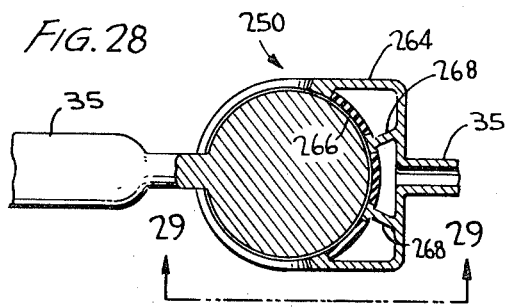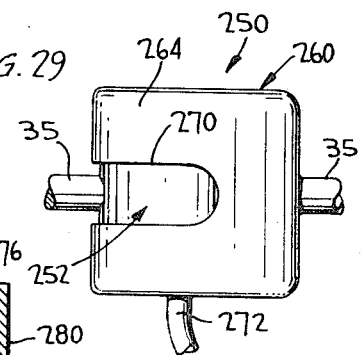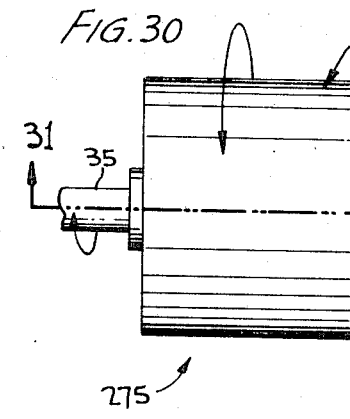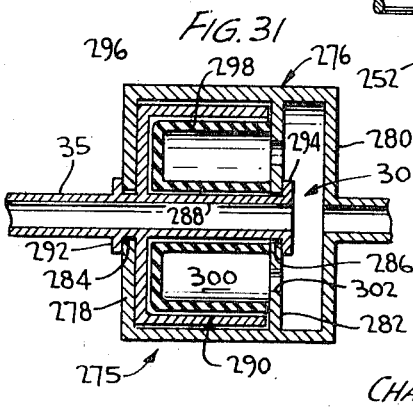

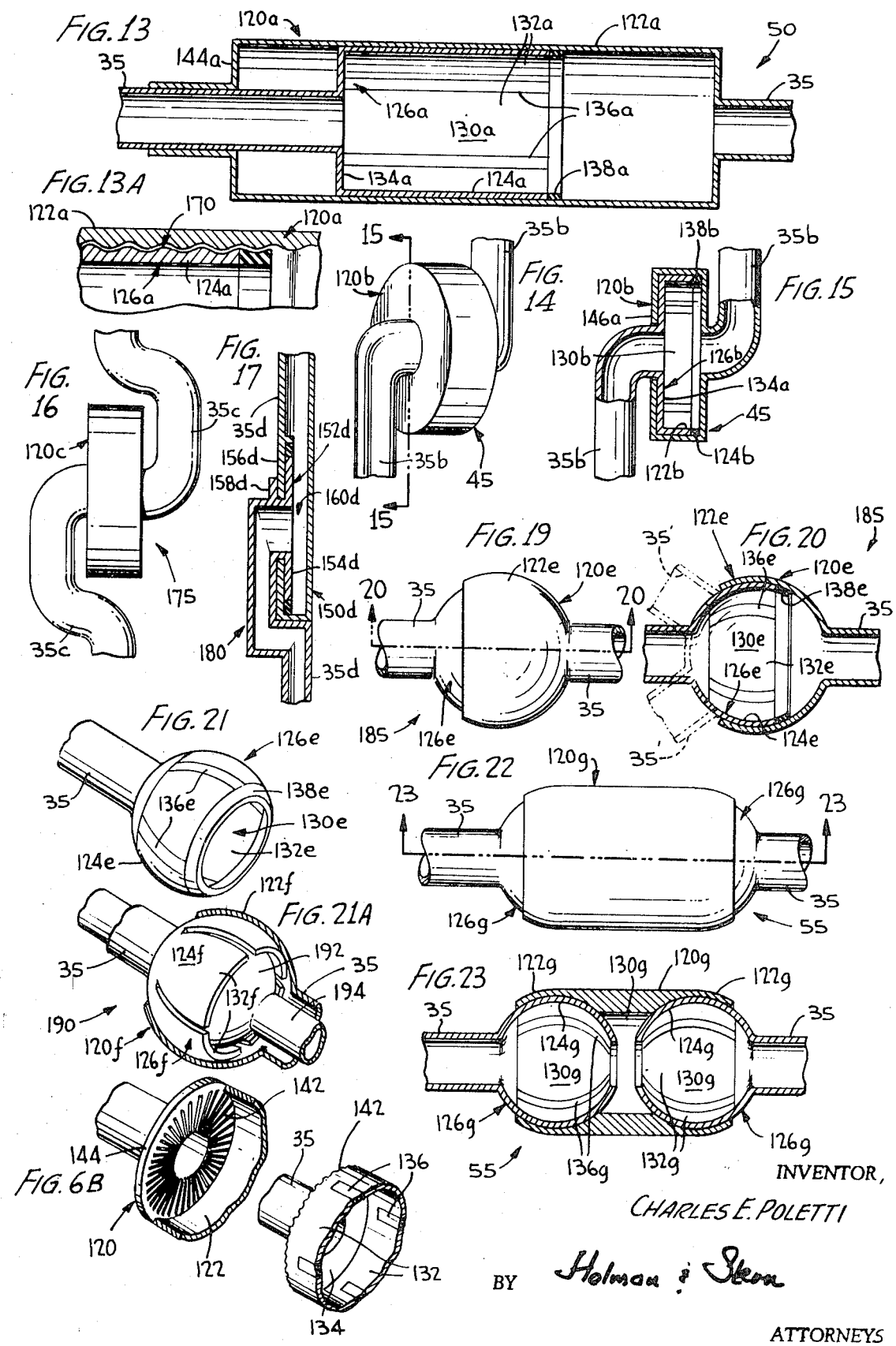

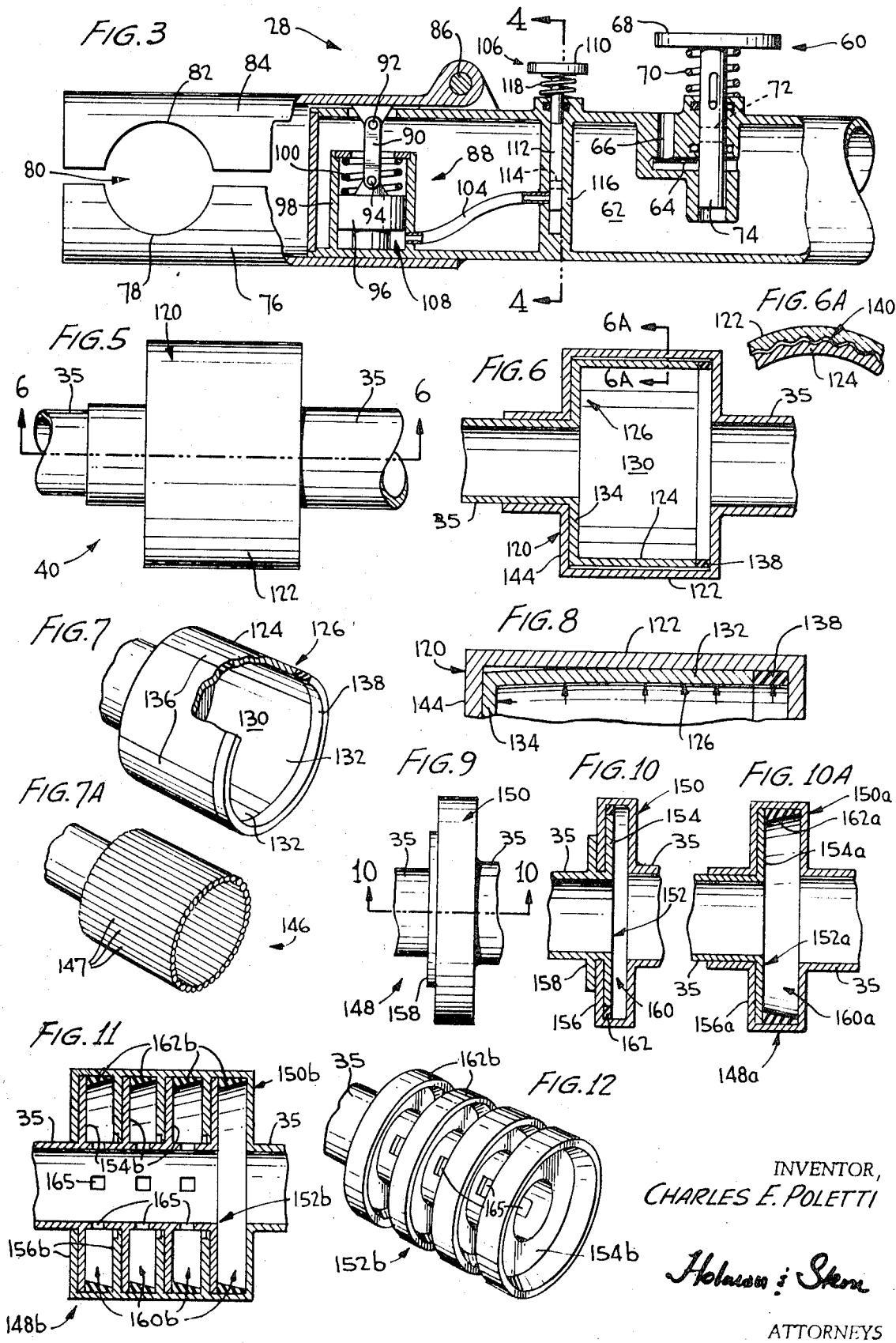

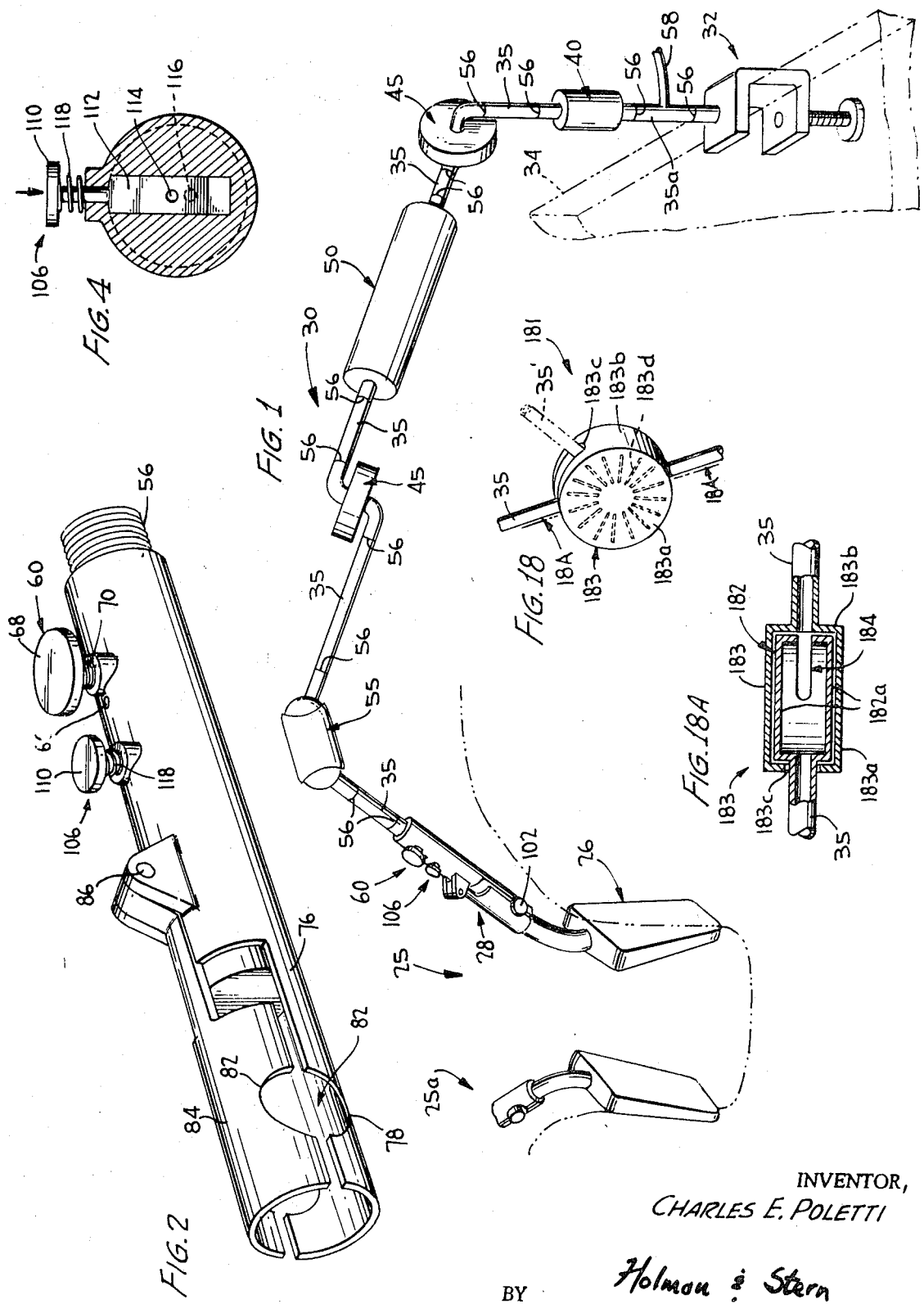

JOINT MEANS FOR USE IN WORK SUPPORTING ARM

This invention relates to a joint means particularly adapted for coupling two elements forming part of a work-supporting arm wherein the joint means are operable between a relaxed condition in which relative movement is permitted between the elements and a rigidified condition in which the elements are secured against relative movement and relates more particularly to a joint means of the type described wherein a fluid under pressure is utilized to effect rigidification, particularly in a continuous system incorporating a plurality of such joint means. Finally, the instant invention relates to the use of such a work-supporting arm in a surgical retractor wherein relaxation of the joint means permits positioning of the surgical retractor in a desired relationship, following which the joint means of the work-supporting arm may be readily rigidified to lock the surgical retractor in the desired position.

The term "work-supporting arm" as utilized in the instant specification and the appended claims shall be understood to include any device, generally of an elongated nature, wherein it may be desired to adjust the relative position between the ends of the device and then lock the device in such adjusted relationship. Ordinarily, such work-supporting arms will have one end fixed to a supporting surface with the opposite end bearing a load or workpiece, the position of which requires adjustment from time to time. The load or workpiece can take various forms and the instant inventive concepts should not be limited in this regard. However, it has been found that the invention described in detail herein is particularly adapted for use with a surgical retractor since the positioning of such devices requires frequent adjustment and the ability to effect such adjustment in a simple and expeditious manner with certainty that the adjusted relationship will be maintained is particularly important.

Adjustable joint means, in and of themselves, are not novel, but ordinarily such adjustment is mechanically accomplished. While a single joint means may provide somewhat universal movement, it is generally necessary to incorporate a plurality of joint means in a single work-supporting arm in order to permit truly universal movement, particularly if it is necessary to adjust the effective length of the arm as well as its angular or rotative relationship. The use of a plurality of mechanically adjusted joint means necessitates either separate manipulation of the adjusting and locking means in each joint or a somewhat complex mechanical linkage to effect simultaneous relaxation or rigidification of the various joint means. In both instances several disadvantages exist. The difficulties in separately manipulating a plurality of joint means to first relax the same so that the relationship of the work-supporting arm can be adjusted in a desired manner and then rigidify or lock each of the joint means to secure the work-supporting arm in the adjusted position are that such a procedure is obviously time consuming and clumsy thereby making it impractical for most applications, particularly when frequent adjustment is required. The alternative of utilizing a mechanical linkage to effect simultaneous relaxation and then simultaneous rigidification of a plurality of joint means in a work-supporting arm is likewise not suitable for most applications. Such mechanical linkages are relatively expensive, cumbersome, difficult to maintain and not particularly reliable in use.

Thus, it will be seen that there is a significant need for a joint means capable of coupling elements forming part of a work-supporting arm which joint means, on the one hand, permits relative movement between the elements when it is desired to adjust the position of one end of the work-supporting arm relative to the other, on the other hand, permitting rigidification to lock the elements in their adjusted relationship, particularly wherein a plurality of such joint means may be utilized in the same work-supporting arm and simultaneously relaxed or rigidified without the need for a complex mechanical linkage. It is therefore, a primary object of the instant invention, to provide such a novel joint means.

In this regard, and particularly as will be readily seen from the detailed description of the instant inventive concepts set forth hereinafter, it is to be understood that the term "joint means" as utilized herein and in the appended claims, includes a coupling or connecting device wherein the elements joined thereby may be moved relative to each other in one manner or another. Thus, such terminology contemplates rotative couplings, universal couplings, telescoping couplings and any combination of the foregoing. A primary objective of this invention, therefore, will be seen to be the provision of joint means capable of providing various types of adjustment, used either singly or in combination, and capable of relaxation and rigidification by a pressurized fluid, the system carrying such pressurized fluid communicating with any number of joint means incorporated in a given work-supporting arm.

Due to the critical nature of surgical retractors, the manipulation of such devices provides special problems. For example, a surgeon or his assistant must be capable of quickly adjusting the position of a surgical retractor as an operation progresses and cannot be required to spend significant time in performing such adjustments or insuring that the surgical retractor will remain in the desired adjusted relationship. Accidental movement of the surgical retractor from a chosen position can obviously cause great damage to a patient undergoing surgery. Thus, the use of a work-supporting arm incorporating joint means according to the instant inventive concepts is particularly suitable in surgical retractors and it is an important object of this invention to provide surgical retractors capable of simple adjustment and reliable securement in an adjusted relationship. Moreover, it is a particular feature of this invention to provide a surgical retractor of the type described wherein the surgical retractor means are secured to a work-supporting arm by a retaining means which utilizes the same pressurized fluid system as provided for rigidification of the joint means in the work-supporting arm to removably clamp the surgical retractor means to the work-supporting arm.

Other and further objects of the instant invention include the provision of various forms of novel joint means, some of which permit relative rotative movement, some of which permit relative universal movement, some of which permit relative axial movement, and some of which permit a combination of such movements between elements of a work-supporting arm coupled thereby; the provision of various means for increasing the locking engagement in the rigidified condition of the joint means between the various parts thereof which are otherwise relatively movable in the relaxed condition of the joint means; the provision of particular forms of joint means which are especially compact for application wherein limited space is available; and the provision of particular joint means incorporating a plurality of coupling members to increase either the relative movement available or the strength of the union provided when the joint means is rigidified. More generally, it is a primary and basic object of this invention to provide a joint means for coupling elements forming part of a work-supporting arm and a surgical retractor incorporating such work-supporting arm which are simple and inexpensive to manufacture, maintain and utilize, sturdy and durable in construction and highly reliable.

These, and still further objects of the instant invention will be readily recognized from the following detailed description which makes reference to the accompanying drawings wherein:

FIG. 1 is a schematic perspective view of a surgical retractor including a work-supporting arm incorporating various forms of novel joint means according to the instant inventive concepts;

FIG. 2 is an enlarged perspective view of the retractor-retaining means and pressurized fluid valve means utilized in the surgical retractor shown in FIG. 1;

FIG. 3 is a side elevational view, partially broken away and in cross section for illustrative clarity and convenience, showing internal details of the device shown in FIG. 2;

FIG. 4 is a transverse cross-sectional view taken substantially on lines 4—4 of FIG. 3;

FIG. 5 is a fragmentary elevational view through one form of novel joint means according to the instant inventive concepts which is operable to permit relative rotative movement between the elements of the work-supporting arm carried thereby;

FIG. 6 is a longitudinal cross-sectional view taken substantially on lines 6—6 of FIG. 5;

FIG. 6A is fragmentary transverse cross-sectional view taken substantially on lines 6A—6A of FIG. 6 and showing the use of axially extending ridge and groove means to increase the locking engagement between the parts of the joint means of FIG. 6 in its rigidified condition;

FIG. 6B is a fragmentary exploded view, partially in cross section, showing the use of radial ridge and groove means for increased locking engagement in a joint means such as that shown in FIG. 6;

FIG. 7 is a perspective view of the inner coupling means of the joint means of FIG. 6, partially broken away and in section for illustrative clarity;

FIG. 7A is a view similar to FIG. 7 of a modified form of inner coupling means which may be used in the joint means of FIG. 5;

FIG. 8 is a fragmentary enlarged cross-sectional view showing the manner in which portions of the inner coupling means are pressed into locking engagement with overlying portions of the outer coupling means in the rigidified condition of the joint means of FIG. 5;

FIG. 9 is a view similar to FIG. 5 of a modified joint means according to the instant invention which provides for relative rotative movement in a more compact manner;

FIG. 10 is a longitudinal cross-sectional view taken substantially on lines 10—10 of FIG. 9;

FIG. 10A is a view similar to FIG. 10 of a slightly modified form of joint means according to this invention;

FIG. 11 is a view similar to FIG. 10 through yet another embodiment of joint means according to this invention which incorporates a plurality of joints of the type shown in FIG. 10A;

FIG. 12 is a perspective view of the inner coupling means of the joint means shown in FIG. 11;

FIG. 13 is a longitudinal cross-sectional view through a further embodiment of joint means according to this invention which permits relative axial or longitudinal movement as well as relative rotative movement between the elements of the work-supporting arm coupled thereby;

FIG. 13A is an enlarged fragmentary cross-sectional view similar to FIG. 6A through a portion of the joint means of FIG. 13 showing circumferential ridge and groove means utilized to increase the locking engagement between the parts of the joint means in the rigidified condition thereof;

FIG. 14 is a perspective view of another form of joint means according to this invention which permits continuous relative rotative movement between the elements of the work-supporting arm coupled thereby in the relaxed condition of the joint means;

FIG. 15 is a partial longitudinal cross-sectional view taken substantially on lines 15—15 of FIG. 14;

FIG. 16 is an elevational view of a joint means similar to FIG. 14 wherein the elements of the work-supporting arm coupled thereby are axially aligned rather than being offset in the manner of the joint means of FIG. 14;

FIG. 17 is a longitudinal cross-sectional view through a joint means of the type shown in FIG. 9, but modified to provide axial alignment of the elements of the work-supporting arm coupled thereby in a direction perpendicular to the center of rotation of the joint means in a manner similar to the joint means of FIG. 16;

FIG. 18 is a perspective view of yet another embodiment of joint means according to this invention permitting relative rotative movement between the elements of a work-supporting arm coupled thereby;

FIG. 18A is a longitudinal cross-sectional view taken substantially on lines 18A—18A of FIG. 18;

FIG. 19 is an elevational view of a joint means incorporating the instant inventive concepts which provides for universal angular movement between the elements of the work-supporting arm coupled thereby;

FIG. 20 is a longitudinal cross-sectional view taken substantially on lines 20—20 of FIG. 19 and showing angularly adjusted positions of a portion of the inner coupling means in dotted lines;

FIG. 21 is a perspective view of the inner coupling means of the joint means of FIG. 19;

FIG. 21A is a perspective view, particularly in cross section, showing a modification of the joint means of FIG. 19 wherein the resilient connections between the spring finger means of the inner coupling means is replaced by an inflatable balloon;

FIG. 22 is an elevational view showing a modification of the joint means of FIG. 19 wherein two universal joint means are provided back to back;

FIG. 23 is a longitudinal cross-sectional view taken substantially on lines 23—23 of FIG. 22;

FIG. 24 is an enlarged fragmentary cross-sectional view through a detent and recess means utilized to increase the locking engagement between the coupling means of a joint means according to the instant inventive concepts;

FIG. 25 is a longitudinal cross-sectional view through yet another embodiment of joint means according to the instant invention wherein the portion movable under the influence of the fluid under pressure is carried by the outer coupling means, rather than the inner coupling means as in the previous embodiments;

FIG. 26 is an enlarged perspective view, partially in cross section, of the joint means of FIG. 25;

FIG. 27 is a longitudinal cross-sectional view through a rotative form of joint means having movable portions in the outer coupling means;

FIG. 28 is a transverse cross-sectional view taken substantially on lines 28—28 of FIG. 27;

FIG. 29 is an elevational view taken substantially on lines 29—29 of FIG. 28;

FIG. 30 is a still further embodiment of rotative joint means according to the instant inventive concepts, shown in elevation; and FIG. 31 is a longitudinal cross-sectional view taken substantially on lines 31—31 of FIG. 30.

Like reference characters refer to like parts throughout the several views of the drawings.

Referring now to the drawings in general, and more particularly to FIGS. 1–4, a surgical retractor according to the instant inventive concepts is designated generally by the reference numeral 25, a portion of a further surgical retractor being shown at 25a for illustrative clarity. Basically, the surgical retractor 25 includes surgical retractor means designated generally by the reference numeral 26, retractor-retaining means designated generally by the reference numeral 28, a work-supporting arm designated generally by the reference numeral 30 and carrying means designated generally by the reference numeral 32. The carrying means 32 is attached to one end of the work-supporting arm 30 in any conventional manner and is adapted to secure said one end against movement. For example, a simple C-clamp adapted to be attached to a portion of an operating table or the like shown in dotted lines at 34 is illustrated.

The work-supporting arm 30 includes at least two elements 35 coupled by a joint means according to the instant inventive concepts. For illustrative purposes a number of different forms of joint means have been schematically shown in FIG. 1 as incorporated into the work-supporting arm 30. Thus, FIG. 1 illustrates a rotative joint means of the type shown, for example, in FIG. 5, designated generally by the reference numeral 40, a pair of rotative joint means of the type shown, for example, in FIG. 14, designated generally by the reference numeral 45, a rotative and telescoping joint means of the type shown, for example, in FIG. 13, designated generally by the reference numeral 50, and a double universal joint means of the type shown, for example, in FIG. 22, designated generally by the reference numeral 55, All of these joint means, and others, will be described in more detail hereinafter. It should be understood that the various forms of joint means shown in FIG. 1 are merely illustrative of the manner in which different types of joint means can be combined in a work-supporting arm generally, and more particularly in a work-supporting arm forming part of a surgical retractor. Certainly, it is not necessary to utilize all of the forms of joint means shown in FIG. 1 and, further, joint means according to other embodiments of the instant inventive concepts as will be described in more detail hereinafter may be substituted for one or more of the joint means illustratively shown in FIG. 1.

The various joint means of this invention are preferably formed as independent devices provided with separable connecting means such as screw threads or the like for selectively attaching a particular joint means to cooperating connecting means such as mating screw threads on the elements 35 of the work-supporting arm 30 or juxtaposed joint means. Such connecting means are schematically illustrated in FIG. 1 at 56. It will be readily recognized that although an element 35 has been shown interposed between each of the various joint means illustrated in FIG. 1, in certain instances the joint means may be directly connected to each other. In this sense, reference in the instant specification and the appended claims to "elements" of the work-supporting arm which are coupled by the joint means is to be understood as including the various nipples secured directly to the relatively movable portions of the individual joint means which may, in turn, be connected to independent elements 35 as illustrated in FIG. 1 or to nipples of juxtaposed joint means, if desired. Therefore, such nipples will be referred to as "elements" in the detailed description set forth hereinafter of the various embodiments of joint means according to the instant inventive concepts.

Each of the elements 35 are hollow defining an internal, continuous passageway therethrough according to preferred embodiments of the instant inventive concepts. Such passageway in one of the elements 35a may communicate through a flexible conduit or the like 58 with a source of fluid under pressure (not shown). Such fluid can take any form, including liquid, although a pressurized gaseous fluid, such as air, is preferred for most purposes.

Fluid from the aforementioned source communicates through the passageways in the elements 35 with the various joint means in the work-supporting arm 30 to rigidify the joint means in a manner to be described in more detail hereinafter thereby locking the work-supporting arm 30 in a given adjusted relationship. Dissipation of the pressure of the fluid within the joint means will relax the work-supporting arm so that it can be readily adjusted to a new relationship. Dissipation can be effected in various manners, a preferred arrangement when the work-supporting arm forms part of a surgical retractor being to incorporate valve means 60 into the retractor-retaining means 28. Thus, as shown particularly at FIG. 3 the pressurized fluid system passes from the aforementioned source through the work-supporting arm into a cavity 62 formed at one end of the retractor-retaining means 28. Bores 64, 66 are provided in the valve means 60 to communicate the cavity 62 with the surrounding atmosphere thereby dissipating the pressure of the fluid within the system when the button 68 of the valves means 60 is depressed against the action of the spring 70 to align the passageway 72 defined through the pin 74 attached to the button 68 with the bore 64. The spring 70 normally maintains the valve means 60 in a closed position wherein the pressure of the fluid is increased sufficiently to rigidify the various joint means in the work-supporting arm 30 in a manner to be described in more detail hereinafter. The button 68 of the valve means 60 is relatively large as will be seen particularly in FIG. 3 so as to overlie the vent formed by the bore 66 whereby pressurized fluid passing therethrough is dispersed by the under part of the button 68 so as not to interfere with the operator of the surgical retractor 25.

A suitable foot pedal (not shown) may be provided to actuate the valve means 60 and/or the valve means 106 to be described hereinafter, if desired.

The retractor-retaining means 28 preferably utilizes the same pressurized fluid system to operate its clamping mechanism for retaining the surgical retractor means 26. Thus, the retractor-retaining means 28 includes a fixed member 76 including portions 78 which define part of a retractor-retaining opening 80, the remainder of the retractor-retaining opening being defined by portions 82 of a movable member 84 pivotally secured by a retainer-hinge means 86 to the fixed member 76 in spaced relationship to the retractor-retaining opening 80, An actuating means designated generally by the reference numeral 88 is carried by the fixed member 76 and includes a link means 90 pivotally secured at 92 at one end to the movable member 84 intermediate the retainer-hinge means 86 and the portions 82. The other end of the link means 90 is pivotally secured at 94 to a piston 96 slidably carried within a cylinder 98. Spring means 100 normally urge the piston 96 within the cylinder 98 away from the movable member 84 thereby normally pulling the movable member 84 to a retaining position wherein the portions 82 cooperate with the portions 78 of the fixed member 76 to clamp a pin 102 therewithin (note FIG. 1), this pin forming part of the surgical retractor means 26.

Conduit means 104 communicate with the cavity 62 through a further valve means designated generally by the reference numeral 106 and carry fluid under pressure to a chamber 108 defined within the cylinder 98 behind the piston 96 whereby when the further valve means 106 is opened, the pressurized fluid overcomes the influence of the spring 100 and moves the piston 96 toward the movable member 84 thereby pushing the movable member about the retainer-hinge means 86 to a releasing position in which the surgical retractor means 26 can be removed from its clamping engagement and replaced, if desired. The further valve means 106 includes a button 110 attached to a member 112 including an aperture 114 alignable with a bore 116 to communicate the conduit 104 with the cavity 62 on depression of the button 110 against the influence of spring means 118.

According to a preferred feature of this invention the spring means 100 is sufficiently strong that if the button 68 of the valve means 60 is depressed thereby dissipating the fluid under pressure to the atmosphere, any remaining pressure passing through the conduit means 104 on depression of the button 110 of the further valve means 106 is insufficient to overcome the influence of the spring means 100 whereby the retractor-retaining means 28 cannot be actuated to its releasing position when the work-supporting arm 30 is relaxed.

Having now described the general function of the work-supporting arm 30 in its preferred use as part of the surgical retractor 25, reference is made to the remainder of the drawings for a detailed description of various embodiments of joint means in accordance with this invention. Basically, each joint means includes a first and second coupling means normally loosely engaged to secure the same against accidental separation while permitting relative movement therebetween to provide the "relaxed" condition of the joint means described previously. A chamber is defined adjacent portions of one of the coupling means with pressurized fluid being selectively introduced into the chamber to move such portions of the one coupling means into locking engagement with juxtaposed portions of the other coupling means until the pressure of the fluid within the chamber is dissipated thereby providing the "rigidified" condition of the joint means. The elements of the work-supporting arm are respectively carried by portions of the joint means which are movable relative to each other in the relaxed condition of the joint means and secured against relative movement in the rigidified condition of the joint means.

According to the general concepts of this arrangement numerous fluid pressure-activated joint means can be provided, various illustrative embodiments being shown in the drawings and described hereinafter.

One form of such joint means is shown at 40 in FIGS. 5–8, this form providing for relative rotational movement between the elements 35. In this joint means 40 an outer coupling means 120 is provided which includes cylindrical portions 122 normally loosely overlying cylindrical portions 124 of an inner coupling means 126 as shown particularly in FIG. 6. The outer coupling means 120 carries one of the elements 35 and the inner coupling means 126 carries the other element 35. A chamber 130 is defined interiorly of the inner coupling means 126 and communicates through the passageways in the elements 35 with a source of fluid under pressure (not shown). The inner coupling means 126 includes an inner securing means in the form of a plurality of spaced spring finger means 132 secured at one end to a disc 134 with strips of a resilient material such as rubber or the like 136 spanning the spaces between the spring finger means 132. The resilient strips 136 normally assume a contracted relationship such as shown in FIGS. 6 and 7 in which the spring finger means 132 are only loosely engaged by the overlying portions 122 of the outer coupling means 120 which define an outer securing means. However, on introduction of fluid under pressure into the chamber 130 the resilient strips 136 assume an expanded relationship to effect movement of the inner securing means, that is, the spring finger means 132 into locking engagement with the outer securing means, that is, the overlying portions 122 of the outer coupling means 120 in the manner shown in FIG. 8 to provide the rigidified condition of the joint means 40. A band of resilient material 138 may be provided at the free ends of the spring finger means 132 to seal the chamber 130 on introduction of the fluid under pressure thereby ensuring that the same does not dissipate between the inner and outer coupling means.

Longitudinally extending cooperating ridge and groove means 140 may be included in the inner and outer securing means as shown for example in FIG. 6A to increase frictional engagement between the coupling means in the rigidified condition of the joint means 40. Similarly, radially extending cooperating ridge and groove means 142 may be provided in the disc 134 and the portion 144 of the outer coupling means 120 which normally overlies this disc to further increase the frictional engagement between the coupling means in the rigidified condition of the joint means 40 as seen, for example, in FIG. 6B.

Additionally, other means may be included to increase the locking engagement between the outer and inner coupling means in the rigidified condition of the joint means. For example, the outer surface of the inner coupling means or the inner surface of the outer coupling means or both may include a material having a high coefficient of friction such as rubber or an abrasive-containing plastic coating (not shown). Other equivalent friction-increasing or lockingly engaging means may be incorporated as desired.

From the foregoing description it will be seen that relative rotation between the outer and inner coupling means and the elements 35 carried thereby will be provided in the relaxed condition of the joint means 40 when the pressure of the fluid within the chamber 130 is dissipated such as by depression of the button 68 of the valve means 60 whereas the coupling means will be locked against relative movement when the pressure of the fluid within the chamber 130 is increased on release of the button 68 of the valve means 60 thereby rigidifying the joint means 40.

FIG. 7A schematically illustrates a modified inner coupling means 146 wherein the cylindrical portions thereof are defined by a multiplicity of elongated filaments 147 which are preferentially expendable in a direction toward the overlying portions of a cooperating outer coupling means of the type shown, for example, at 120 in FIG. 6, on introduction of the fluid under pressure in the rigidified condition of the joint means. Such filaments may be formed of any suitable resilient material, secured together to form a generally continuous cylindrical portion. Alternatively, a solid, but resilient, cylindrical portion may be utilized in place of the portion formed by the filaments 147 so long as the same will expand radially on introduction of the fluid under pressure.

The joint means 148 shown in FIGS. 9 and 10 also provides relative rotational movement between the elements 35 and, although not providing as substantial a locking engagement between the outer and inner coupling means 150, 152, respectively, is substantially more compact and will find use in certain instances. The inner coupling means 152, in this embodiment, includes a circular disc 154, normally loosely engaged by circular portions 156 of the outer coupling means 150, with a flange 158 being provided to preclude accidental separation between the coupling means and to maintain the spacing necessary for defining the cavity 160 interiorly of the disc member 156. A resilient sealing means 162 may be provided in this embodiment in a manner similar to the sealing means 138 in the embodiment of FIGS. 5–8 and, additionally, cooperating radially extending ridge and groove means such as shown in FIG. 6B, can also be included in this embodiment to increase frictional engagement between the coupling means on introduction of fluid under pressure into the chamber 160.

The embodiment of FIG. 10A is similar to the embodiment of FIGS. 9 and 10, but utilizes a tapered cylindrical sealing means 162a in place of the circular band 162 shown in FIG. 10. In this manner, the flange 158 is avoided. Other portions of this embodiment similar to parts of the embodiment shown in FIGS. 9 and 10 have been designated by the same reference numeral followed by a suffix *a* for illustrative clarity.

Thus, on introduction of fluid under pressure into either chamber 160 or 160a, the disc member 154 or 154a of the inner coupling means 152 or 152a, respectively, is pressed into engagement with the overlying portions 156 or 156a to rigidify the joint means and preclude further rotational movement between the elements 35.

In FIGS. 11 and 12 the modification of the joint means of FIG. 10A is shown wherein the inner and outer securing means, that is, the disc member of the inner coupling means and the overlying circular portions of the outer coupling means, are multiplied to increase the locking engagement between the coupling means in the rigidified condition of the joint means. Portions of the joint means shown in FIGS. 11 and 12 which are similar to parts of the joint means 148a of FIG. 10A have been designated by the same reference numerals followed by the suffix *b*. In this embodiment it will be seen that there are a plurality of disc members 154b each of which is juxtaposed to circular portions 156b of the outer coupling means 150b. The chamber is defined by a series of communicating cavities 160b formed interiorly of each disc member 154b with respect to the overlying portion 156b of the outer coupling means 150b, apertures 165 communicating each of the cavities 160b with each other.

The joint means 50 shown in FIG. 13 is quite similar to the joint means 40 shown in FIGS. 5–8 and reference numerals of portions of the joint means 50 similar to parts of the joint means 40 have been designated by the same reference numerals followed by the suffix *a* for illustrative clarity. In the joint means 50 the inner coupling means 126a is substantially shorter than the outer coupling means 120a whereby not only are the coupling means rotational relative to each other, but also axially movable for longitudinal adjustment of the joint means. In this embodiment the diameter of the cylindrical portions of the inner coupling means 156a must be substantially smaller than the length of the spring finger means 124a so that, on increase of the pressure of the fluid within the chamber 130a, the spring finger means will be pressed radially into locking engagement with the outer coupling means 120a before the pressure acting on the disc portion 134a can effect relative axial movement between the coupling means.

In FIG. 13A circumferentially extending cooperating ridge and groove means 170 are shown which function in a manner similar to the ridge and groove means 140 shown in FIG. 6A and the ridge and groove means 144 shown in FIG. 6B to increase the locking engagement between the coupling means in the rigidified condition of the joint means. It is to be understood that the ridge and groove means shown in any of these embodiments may be utilized, where suitable, in other embodiments of joint means according to this invention.

Yet a further modification of the rotational-type of joint means is shown at 45 in FIGS. 14 and 15, this embodiment being similar to the embodiment of FIGS. 5-8 with the exception of the arrangement of the elements with respect to the axis of rotation of the joint means. Portions of this embodiment similar to parts of the embodiment of FIGS. 5-8 have been designated by the same reference numerals followed by the suffix b. As will be seen from the drawings, the elements 35b are bent at a 90° angle from the axis of rotation of the joint means 45 and extend in an offset, parallel relationship to each other to permit continuous bypassing of the elements 35b in the relaxed condition of the joint means 45.

In the embodiment of FIG. 16, which bears like reference numerals followed by the suffix c, the elements 35c are further bent around the joint means so that they are axially aligned in a direction at right angles to the axis of rotation of the joint means, which in this instance is designated generally by the reference numeral 175.

The embodiment of FIG. 17, identified generally by the reference numeral 180, is similar to the embodiment of FIGS. 9 and 10, modified in a manner similar to the embodiment of FIG. 16 to provide axially aligned elements extending perpendicularly to the axis of rotation of the joint means. Portions of this embodiment similar to parts of the embodiment of FIGS. 9 and 10 have been designated by the same reference numerals followed by the suffix d for illustrative clarity. In this embodiment the element 35d carried by the outer coupling means 150d includes a passageway in redial communication with the chamber 160d whereas the element 35d carried by the inner coupling means 152d includes a passageway which communicates with the chamber 160d at the axis of rotation.

Yet a further joint means according to this invention is illustrated at 181 in FIGS. 18 and 18A. In this embodiment the inner coupling means 182 includes a pair of spaced, circular paddles or disc members 182a which are pressed outwardly in the rigidified condition of the joint means into locking engagement with juxtaposed circular wall members 183a forming part of an outer coupling means 183 on introduction of fluid under pressure into the chamber 184 defined between the disc members 182a. A peripheral wall portion 183b connects the wall members 183a of the outer coupling means and defines an elongated slot 183c for guiding one of the elements 35 attached to the disc members 182a of the inner coupling means 182, an adjusted position of the element 35 being shown at 35' in dotted lines. The other element 35 of the work-supporting arm is carried by the outer coupling means 183 either on the peripheral wall portion 183b as shown in the drawings for adjustable positioning of the elements in the same plane or on one of the wall members 183a (not shown) for adjustable positioning of the elements in planes extending at a right angle to each other. Cooperating ridge and groove means may be provided between the disc members 182a and the wall members 183a if desired, as schematically illustrated by the dashed lines 183d in FIG. 18. If necessary, stripes of resilient material such as shown in FIG. 7 at 136 or a balloon as described with reference to the embodiment of FIG. 21A, infra, as well as a sealing strip such as shown at 138 in FIG. 7 may be utilized with joint means 181 if desired to improve its efficiency.

Each of the foregoing embodiments has provided either relative rotational movement alone or relative rotational and relative longitudinal movement between the coupling means and, thus, the elements carried thereby. Reference is now made to FIGS. 19-21 for a joint means according to the instant inventive concepts wherein the coupling means, and thus, the elements carried thereby, are relatively movable in a universal relationship with respect to each other, the joint means being designated generally by the reference numeral 185. In actuality, this joint means is quite similar to the embodiment of FIGS. 5-8 whereby portions having a similar function are identified by the same reference numerals followed by the suffix e. The basic distinction between the embodiment of FIGS. 19-21 and the embodiment of FIGS. 5-8 is that the portions 122e of the outer coupling means 120e and the juxtaposed portions 124e of the inner coupling means 126e of the embodiment of FIGS. 19-21 are generally spherical in contrast to the cylindrical configuration of the embodiment of FIGS. 5-8. This permits rotational as well as angular adjustment in a generally universal fashion between the inner coupling means 126e and the outer coupling means 120e in the relaxed condition of the joint means 185. For example, alternate positions of the element attached to the inner coupling means 126e are shown at 35' in FIG. 20 in dotted lines.

Yet a further modification of joint means according to this invention is shown generally at 190 in FIG. 21A, portions which function in a manner similar to parts of the embodiment of FIGS. 5-8 being designated by the same reference numeral followed by the suffix f. In this embodiment the strips of resilient material 136 and the sealing strip 138 have been eliminated and a resilient balloon 192 is disposed interiorly of the spring finger means 132f of the inner coupling means 126f. This balloon 192 defines the chamber (not shown) and functions to span the spaces between the spring finger means 132f whereupon, upon introduction of fluid under pressure through the conduits 194 attached to the balloon 192, the resilient material of the balloon is expanded to move the spring finger means 132f into locking engagement with the overlying portion 122f of the outer coupling means 120f. Again, it is to be understood that the basic feature of this embodiment of the instant inventive concepts, that is, the use of a balloon, can readily be incorporated into other embodiments of joint means according to this invention. For example, the joint means 40 shown in FIGS. 5-8 can obviously be adapted to replace the resilient strips 126 and the sealing means 138 with a balloon disposed interiorly of the spring finger means 132.

The universal joint means shown at 185 in FIGS. 19-21 can be further modified in the manner shown in FIGS. 22 and 23 to provide a double-universal joint means, identified generally by the reference numeral 55. Portions of this joint means similar to parts of the previous embodiment have been designated by the same reference numeral followed by the suffix g, for illustrative clarity. In this embodiment, the outer coupling means 120g is generally in the form of a sleeve having spherical portions 122g at each end of the same overlying spherical portions 124g of two inner coupling members 126g, one of the elements 35 being carried by each of the inner coupling members 126g. The chamber 130g is defined interiorly of each inner coupling means 126g and extends into a common central chamber 130g'. Thus, it will be seen that the embodiment of FIGS. 22 and 23 provides for twice the universal movement of the embodiment of FIGS. 19-21.

In FIG. 24 a modified form of securing means is designated generally by the reference numeral 200 and comprises basically an inner securing means in the form of detent means 202 defined by portions of the inner coupling means designated generally by the reference numeral 204, and outer securing means including cooperating recess means 206 defined by portions of the outer coupling means designated generally by the reference numeral 208. Spring means 210 are provided for normally urging the detent means 202 out of engagement with the recess means 206 in the relaxed condition of the joint means, the detent means 202 being moved against the influence of the spring means 120 into engagement with the recess means 206 on introduction of fluid under pressure into the chamber 212 thereby lockingly engaging the inner and outer coupling means in the rigidified condition of the joint means. A vent 214 is provided in the outer coupling means 208 to facilitate movement of the detent means 202 into the recess means 206. It is to be understood that this form of securing means may be utilized in addition to, or in place of, any of the other securing means shown in any of the other embodiments of joint means according to the invention described hereinabove or hereafter.

Previous embodiments of the instant inventive concepts have generally utilized what might be termed an interior chamber with portions of an inner coupling means being movable outwardly upon the introduction of pressurized fluid into the chamber into locking engagement with overlying portions of an outer coupling means. However, it should be recognized that the basic fluid-actuated joint means of the instant invention contemplates a reverse arrangement, that is, what might be termed an exterior chamber with portions of an outer coupling means being movable inwardly into locking engagement with underlying portions of an inner coupling means. Reference is made, for example, to FIGS. 25–29 for embodiments of this type.

In FIGS. 25 and 26 a universal-type joint means is designated generally by the reference numeral 225 and comprises an inner coupling means in the form of a solid spherical element 226 secured to one of the elements 35 by a stud 228. An outer coupling means 230 includes a plurality of communicating hollow finger means 232 which together define a chamber 234 communicating with the other element 35 of the work-supporting arm. Exterior portions 236 of the outer coupling means 230 are connected to resilient interior portions 238 of the finger means 232 by spaced lugs 240 and a resilient conduit means 242 communicates the chamber 234 with the interior of the element 35 connected to the inner coupling means 226.

With the embodiment of FIGS. 25 and 26 universal movement between the elements of the work-supporting arm is permitted when the pressure of the fluid within the chamber 234 is dissipated, the stud 228 moving into the spaces between the finger means 232 for greater relative movement between the elements. However, on increase of pressure within the chamber 234 the resilient portions 238 of the finger means 232 assume an expanded relationship and move into locking engagement with the juxtaposed portions of the inner coupling means 226 to define the rigidified condition of the joint means 225.

A similar arrangement has been shown in the joint means 250 of FIGS. 27–29, this embodiment being adapted for relative rotational movement between the coupling means and the elements 35. The inner coupling means 252 of the joint means 250 is in the form of a solid cylindrical member having opposed circular faces 254 and a peripheral wall portion 256 which carries the stud 258 connected to one of the elements 35. The outer coupling means 260 defines a chamber 262 between an outer wall portion 264 and resilient inner wall portions 266 connected by spaced studs 268. A slot 270 is defined in the peripheral wall portion of the outer coupling means 260 through which the element 35 connected to the inner coupling means 252 extends to guide movement of the inner coupling means element relative to the outer coupling means element. Again, a flexible conduit means 272 communicates the chamber 262 with the element 35 carried by the inner coupling means 252. This embodiment functions in a manner similar to the embodiment of FIGS. 25 and 26.

Yet another embodiment of the instant inventive concepts is shown in FIGS. 30 and 31 and identified generally by the reference numeral 275. The outer coupling means 276 in this embodiment includes a generally cylindrical outer coupling member having a longitudinal axis and a pair of end wall portions 278, 280 with a transversely extending plate 282 therewithin. Aligned axial apertures 284, 286 are defined in the end wall portion 278 and the plate 282 and a hollow tubular element 288 forming part of the inner coupling means 290 is rotatably secured between the end wall portion 278 and the plate 282 by flanges 292, 294. The tubular element 288 carries cup-shaped portions 296 between the end wall portion 278 and the plate 282. A resilient annular member 298 is carried by the plate 282 and is normally loosely engaged within the cup-shaped portions 296 of the inner coupling means 290, this annular member 298 defining a chamber 300 communicating through apertures 302 in the plate 282 with a cavity 304 defined between the plate 282 and the end portion 280.

Thus, the embodiment of FIGS. 30 and 31 provides relative rotational movement between the elements of the work-supporting arm and may be considered a combination of the various embodiments heretofore described in that the outer coupling means actually carries the portions to be moved by the fluid pressure, but such portions are arranged interiorly of the inner coupling means. On introduction of fluid under pressure into the chamber 300 the resilient annular member 298 assumes an expanded relationship to lockingly engage the cup-shaped portions 296 and the tubular element 288 of the inner coupling means 290 to produce the rigidified condition of the joint means 275.

From reviewing the foregoing detailed description of this invention, it will be apparent that there is herein provided an improved joint means, particularly for use in coupling elements of a work-supporting arm, especially in a surgical retractor, which satisfies all of the objectives of the instant invention as set forth initially, and others, including many advantages of great practical utility and commercial importance. Accordingly,

What is claimed is:

1. A joint means for coupling two elements forming part of a work-supporting arm, said joint means being operable between a relaxed condition in which relative movement is permitted between the elements of the work-supporting arm and a rigidified condition in which the elements of the work-supporting arm are secured against relative movement, said joint means including first and second coupling means normally loosely engaged to secure the same against accidental separation while permitting relative movement therebetween providing the relaxed condition of said joint means, means defining a chamber adjacent portions of one of said first and second coupling means, and means for selectively introducing a fluid under pressure into said chamber to thereby move said portions of said one coupling means into locking engagement with juxtaposed portions of the other of said first and second coupling means to preclude relative movement between said first and second coupling means until the pressure of said fluid is dissipated, thereby providing the rigidified condition of said joint means, the elements of the work-supporting arm being respectively carried by portions of said joint means which are movable relative to each other in said relaxed condition of said joint means and secured against relative movement in said rigidified condition of said joint means, said portions of said one coupling means including detent means, said juxtaposed portions of said other coupling means including recess means, spring means normally urging said detent means out of engagement with said recess means in said relaxed condition of said joint means, said detent means being moved against the influence of said spring means into engagement with said recess means on introduction of said fluid under pressure into said chamber thereby lockingly engaging said first and second coupling means in said rigidified condition of said joint means.

2. A joint means for coupling two elements forming part of a work-supporting arm, said joint means being operable between a relaxed condition in which relative movement is permitted between the elements of the work-supporting arm and a rigidified condition in which the elements of the work-supporting arm are secured against relative movement, said joint means including first and second coupling means normally loosely engaged to secure the same against accidental separation while permitting relative movement therebetween thereby providing the relaxed condition of said joint means, means defining a chamber adjacent portions of one of said first and second coupling means, and means for selectively introducing a fluid under pressure into said chamber to thereby move said portions of said one coupling means into locking engagement with juxtaposed portions of the other of said first and second coupling means to preclude relative movement between said first and second coupling means until the pressure of said fluid is dissipated, thereby providing the rigidified condition of said joint means, the elements of the work-supporting arm being respectively carried by portions of said joint means which are movable relative to each other in said relaxed condition of said joint means and secured against relative movement in said rigidified condition of said joint means, said portions of said one coupling means including a plurality of spaced spring finger means attached to each other at only one end of the same, and resilient means spanning the spaces between said spring finger means, said resilient means normally assuming a contracted relationship in which said spring finger means only loosely engage said juxtaposed portions of said other coupling means in said relaxed condition of said joint means, said resilient means assuming an expanded relationship on introduction of said fluid under pressure into said chamber to effect movement of said spring finger means into locking engagement with said juxtaposed portions of said other coupling means in said rigidified condition of said joint means, said resilient means being strips of resilient material connected to said spring finger means and spanning the spaces between said spring finger means.

3. A joint means according to claim 2 wherein said portions of said one coupling means and said juxtaposed portions of said other coupling means are generally cylindrical having a common longitudinal axis, one end of each element of the work-supporting arm being carried by its respective coupling means in alignment with said axis whereby said coupling means and the elements of the work-supported arm carried thereby may be rotatably moved with respect to each other about said axis in said relaxed condition of said joint means.

4. A joint means according to claim 3 wherein said cylindrical portions of said one coupling means are relatively shorter than said cylindrical portions of said other coupling means, the diameter of said cylindrical portions of said one coupling means being substantially shorter than the length of the same, whereby said coupling means and the elements of the work-supporting arm carried thereby may additionally be longitudinally moved with respect to each other along said axis in said relaxed condition of said joint means.

5. A joint means according to claim 3 wherein the portions of each element of the work-supporting arm beyond the said one end thereof are bent at an angle of about 90° to said axis.

6. A joint means according to claim 5 wherein the said portions of the elements of the work-supporting arm extend in parallel, offset relationship to each other to permit continuous bypassing of the elements of the work-supporting arm on relative rotation of said coupling means in said relaxed condition of said joint means.

7. A joint means according to claim 2 wherein said portions of said one coupling means and said juxtaposed portions of said other coupling means are generally spherical having a common center of rotation, whereby said coupling means and the elements of the work-supporting arm carried thereby may be universally moved with respect to each other about said center of rotation in said relaxed condition of said joint means.

8. A joint means according to claim 7 wherein said other coupling means comprises a sleeve defining spaced, generally spherical overlying portions at opposite ends thereof, said one coupling means comprising two inner coupling members, each of said inner coupling members including generally spherical portions normally loosely engaged by one of said generally spherical overlying portions of said one coupling means in said relaxed condition of said joint means, the elements of the work-supporting arm being respectively carried by each of said inner coupling members, thereby providing increased universal movement between said coupling means and the elements of the work-supporting arm carried thereby in the relaxed condition of said joint means.

9. A joint means for coupling two elements forming part of a work-supporting arm, said joint means being operable between a relaxed condition in which relative movement is permitted between the elements of the work-supporting arm and a rigidified condition in which the elements of the work-supporting arm are secured against relative movement, said joint means including first and second coupling means normally loosely engaged to secure the same against accidental separation while permitting relative movement therebetween thereby providing the relaxed condition of said joint means, means defining a chamber adjacent portions of one of said first and second coupling means, and means for selectively introducing a fluid under pressure into said chamber to thereby move said portions of said one coupling means into locking engagement with juxtaposed portions of the other of said first and second coupling means to preclude relative movement between said first and second coupling means until the pressure of said fluid is dissipated, thereby providing the rigidified condition of said joint means, the elements of the work-supporting arm being respectively carried by portions of said joint means which are movable relative to each other in said relaxed condition of said joint means and secured against relative movement in said rigidified condition of said joint means, said portions of said one coupling means including a plurality of communicating hollow finger means having resilient portions normally assuming a contracted relationship in which said resilient portions only loosely engage said juxtaposed portions of said other coupling means in said relaxed condition of said joint means, said chamber being defined by said communicating hollow finger means, said resilient portions of said finger means assuming an expanded relationship on introduction of said fluid pressure into said chamber to effect movement of said resilient portions of said finger means into locking engagement with said juxtaposed portions of said other coupling means in said rigidified condition of said joint means.

10. A joint means for coupling two elements forming part of a work-supporting arm, said joint means being operable between a relaxed condition in which relative movement is permitted between the elements of the working-supporting arm and a rigidified condition in which the elements of the work-supporting arm are secured against relative movement, said joint means including first and second coupling means normally loosely engaged to secure the same against accidental separation while permitting relative movement therebetween thereby providing the relaxed condition of said joint means, means defining a chamber adjacent portions of one of said first and second coupling means, and means for selectively introducing a fluid under pressure into said chamber to thereby move said portions of said one coupling means into locking engagement with juxtaposed portions of the other of said first and second coupling means to preclude relative movement between said first and second coupling means until the pressure of said fluid is dissipated, thereby providing the rigidified condition of said joint means, the elements of the work-supporting arm being respectively carried by portions of said joint means which are movable relative to each other in said relaxed condition of said joint means and secured against relative movement in said rigidified condition of said joint means, said portions of said one coupling means including a generally circular, generally planar disc member, said juxtaposed portions of said other coupling means including a generally circular, generally planar wall member, spacing means normally positioning said disc member in loose engagement with said wall member in said relaxed condition of said joint means, said fluid under pressure bearing against said disc member and pressing the same into locking engagement with said wall member in said rigidified condition of said joint means.

11. A joint means according to claim 10 wherein said portions of said first and second coupling means include ridge means and cooperating groove means, respectively, to increase frictional engagement between said coupling means in said rigidified condition of said joint means.

12. A joint means according to claim 10 wherein the element of the work-supporting arm associated with said one coupling means comprises a hollow tube defining an internal passageway, said disc member including portions defining a generally central aperture, and the element of the work-supporting arm associated with said one coupling means being carried by said disc member with its internal passageway communicating with said chamber through said aperture.

13. A joint means according to claim 12 wherein said one coupling means includes a pair of disc members surrounding the element of the work-supporting arm associated therewith in axially spaced relationship to define an annular guide groove therebetween, said wall member of said other coupling means extending within said guide groove, and said fluid under pressure bearing against one of said disc members and pressing the same into locking engagement with said wall member in said rigidified condition of said joint means.

14. A joint means according to claim 12 wherein said one coupling means further includes a plurality of spring finger means secured in spaced relationship to the periphery of said disc member and extending in a direction generally perpendicular to said disc member, a resilient means spanning the spaces between said spring finger means, said other coupling means further including a portion defining a generally cylindrical outer element extending in a direction generally perpendicular to said wall member and overlying said spring finger means, said resilient means normally assuming a contracted relationship in which said spring finger means only loosely engage said outer element when said disc member only loosely engages said wall member in said relaxed condition of said joint means, and said resilient means assuming an expanded relationship on introduction of said fluid under pressure into said chamber to effect movement of said spring finger means into locking engagement with said outer element when said disc member is pressed into locking engagement with said wall member in said rigidified condition of said joint means.

15. A joint means for coupling two elements forming part of a work-supporting arm, said joint means being operable between a relaxed condition in which relative movement is permitted between the elements of the work-supporting arm and a rigidified condition in which the elements of the work-supporting arm are secured against relative movement, said joint means including first and second coupling means normally loosely engaged to secure the same against accidental separation while permitting relative movement therebetween thereby providing the relaxed condition of said joint means, means defining a chamber adjacent portions of one of said first and second coupling means, and means for selectively introducing a fluid under pressure into said chamber to thereby move said portions of said one coupling means into locking engagement with juxtaposed portions of the other of said first and second coupling means to preclude relative movement between said first and second coupling means until the pressure of said fluid is dissipated, thereby providing the rigidified condition of said joint means, the elements of the work-supporting arm being respectively carried by portions of said joint means which are movable relative to each other in said relaxed condition of said joint means and secured against relative movement in said rigidified condition of said joint means, said portions of said one coupling means including a pair of generally circular, generally planar disc members, said juxtaposed portions of said other coupling means including a pair of generally circular, generally planar wall members, a generally cylindrical peripheral wall portion connecting said wall members, one of the elements of the work-supporting arm being carried by said peripheral wall portion, each of said wall members normally loosely engaging one of said disc members in said relaxed condition of said joint means, said chamber being defined between said disc members, a resilient connection between the other of the elements of the work-supporting arm and both of said disc members, and portions of said peripheral wall defining an elongated slot through which the element carried by said disc members extends, said slot forming a guide for movement of the element carried by said disc members relative to the element carried by said peripheral wall portion in said relaxed condition of said joint means, said fluid under pressure bearing against said disc members and pressing the same into locking engagement with said wall members in said rigidified condition of said joint means.

16. A joint means for coupling two elements forming part of a work-supporting arm, said joint means being operable between a relaxed condition in which relative movement is permitted between the elements of the work-supporting arm and a rigidified condition in which the elements of the work-supporting arm are secured against relative movement, said joint means including first and second coupling means normally loosely engaged to secure the same against accidental separation while permitting relative movement therebetween thereby providing the relaxed condition of said joint means, means defining a chamber adjacent portions of one of said first and second coupling means, and means for selectively introducing a fluid under pressure into said chamber to thereby move said portions of said one coupling means into locking engagement with juxtaposed portions of the other of said first and second coupling means to preclude relative movement between said first and second coupling means until the pressure of said fluid is dissipated, thereby providing the rigidified condition of said joint means, the elements of the work-supporting arm being respectively carried by portions of said joint means which are movable relative to each other in said relaxed condition of said joint means and secured against relative movement in said rigidified condition of said joint means, said portions of said one coupling means including a plurality of first coupling members spaced from each other, said juxtaposed portions of said other coupling means including a plurality of second coupling members spaced from each other, one of said second coupling members being loosely engaged with each of said first coupling members in said relaxed condition of said joint means, said chamber being defined by a series of communicating cavities formed interiorly of each of said first coupling members with respect to its associated second coupling member.

17. A joint means for coupling two elements forming part of a work-supporting arm, said joint means being operable between a relaxed condition in which relative movement is permitted between the elements of the work-supporting arm and a rigidified condition in which the elements of the work-supporting arm are secured against relative movement, said joint means including first and second coupling means normally loosely engaged to secure the same against accidental separation while permitting relative movement therebetween thereby providing the relaxed condition of said joint means, means defining a chamber adjacent portions of one of said first and second coupling means, and means for selectively introducing a fluid under pressure into said chamber to thereby move said portions of said one coupling means into locking engagement with juxtaposed portions of the other of said first and second coupling means to preclude relative movement between said first and second coupling means until the pressure of said fluid is dissipated, thereby providing the rigidified condition of said joint means, the elements of the work-supporting arm being respectively carried by portions of said joint means and secured against relative movement in said rigidified condition of said joint means, said one coupling means including a generally cylindrical outer coupling member having a longitudinal axis and a pair of end wall portions, a transversely extending plate within said outer coupling member, one of the elements of the work-supporting arm being carried by one of said end wall portions of said outer coupling member, aligned axial apertures being defined in the other end wall portion and in said plate of said outer coupling member, said other coupling means including an inner coupling member having cup-shaped portions carried between said other end wall portion and said plate of said outer coupling means, a tubular element carried by said cup-shaped portions of said inner coupling member and rotatably secured between said other end wall portion and said plate of said outer coupling member, a resilient annular member carried by said plate of said outer coupling member and normally loosely engaged within said cup-shaped portions and around said tubular element of said inner coupling member, said resilient annular member defining said chamber, and apertures in said plate communicating said chamber with an auxiliary chamber defined between said plate and said one end wall portion of said outer coupling member, said resilient annular member assuming an expanded relationship on introduction of said fluid under pressure into said chamber to lockingly engage said cup-shaped portions and said tubular element of said inner coupling member in said rigidified condition of said joint means.

* * * * *